United States Patent [19]

Hood

[11] 4,016,292

[45] Apr. 5, 1977

[54] PROCESS FOR IMPROVING THE COLOR STABILITY OF FRESH MEAT

[76] Inventor: David Edward Hood, 13 Taney Rd., Dundrum, Dublin 14, Ireland

[22] Filed: Sept. 3, 1974

[21] Appl. No.: 502,862

[52] U.S. Cl. .................................. 426/2; 426/265; 426/332; 426/641

[51] Int. Cl.$^2$ ........................................ A23L 1/31

[58] Field of Search ............ 426/2, 55, 58, 63, 264, 426/265, 641

[56] References Cited

UNITED STATES PATENTS

| | | | |
|---|---|---|---|
| 2,942,982 | 6/1960 | Wtcehshall et al. | 426/2 |
| 3,042,529 | 7/1962 | Radouco-Thomas | 426/2 |
| 3,597,236 | 8/1971 | Hopkins et al. | 426/265 |

*Primary Examiner*—Monacell A. Louis
*Assistant Examiner*—R. A. Yoncoskie
*Attorney, Agent, or Firm*—Young & Thompson

[57] ABSTRACT

The invention relates to a process for improving the color stability of fresh meat by parenterally administering a massive dose of an ascorbate to the animal, allowing distribution of the ascorbate through the vascular system of the animal and then slaughtering the animal.

7 Claims, No Drawings

PROCESS FOR IMPROVING THE COLOR STABILITY OF FRESH MEAT

The present invention relates to a process for improving the colour stability of fresh meat, particularly fresh meat, particularly that of bovine animals, for example beef, which is to be sold as prepackaged individual cuts such as fillet steak or sirloin steak.

There is an increasing demand for cuts of meat to be supplied in prepackaged form from food processing plants to retail outlets. However, consumers expect fresh meat to have a bright red colour and the shelf life of prepackaged meat is limited by lack of stability in this colour.

The purple colour of freshly cut meat, and meat packaged in the absence of air is due to the muscle pigment myoglobin which exists in the reduced state under anaerobic conditions. When meat is exposed to air, myoglobin rapidly combines with oxygen to form bright red oxymyoglobin at the surface, giving cut meat its typical attractive red appearance. In order to maintain the bright red colour of fresh meat it is necessary to supply oxygen continuously to the meat surface and it is usual to package cuts of meat in permeable film which admits air. Continuous exposure of meat to oxygen, however, gradually leads to oxidation of the myoglobin pigment. The resulting metmyoglobin is brown in colour and its formation at the surface causes discolouration of the meat. Oxidation occurs most rapidly when the concentration of oxygen is low.

Consumers associate the bright red colour of the meat with freshness and tend to assume that meat which has been exposed for long enough to lose its red colour has also suffered bacterial deterioration. However, if animals are slaughtered under bacteriologically clean conditions and the meat is carefully prepared and cut and then stored close to freezing point, bacterial contamination of the meat can be reduced to a minimum. This means that the meat can have a fairly long shelf life without bacterial decomposition setting in. It is desirable, therefore, to be able to improve the colour stability of the meat so that it retains its bright red colour for an equally long period.

The present invention provides a process for improving the colour stability of fresh meat which comprises introducing a massive dose of ascorbic acid or a salt thereof into the vascular system of a living animal, holding the animal for a time sufficient to attain distribution of the ascorbic acid or salt thereof throughout the muscle tissues, and then slaughtering the animal under bacteriologically clean conditions. The conditions should be as close to sterile conditions as commercial slaughter and meat processing practices will permit.

The dose of ascorbic acid or salt thereof will vary depending on the size of the animal but normally a dose within the range from 0.15 g to 1.5 g per kg. liveweight will be suitable. Preferably, the dose is within the range 0.25 to 1.25g. per kg. liveweight. The time for which the animal is held before slaughtering will be comparable to the holding time used when tenderising enzymes are introduced into the vascular system in accordance with known techniques. For example, a time within the range from 1 minute up to 1 hour may be suitable. The ascorbic acid or salt thereof is preferably administered in a parenterally-acceptable nontoxic diluent, such as saline.

Ascorbic acid (vitamin C) is acceptable for human consumption and indeed it is widely recommended for health reasons. The presence of residual ascorbic acid or ascorbate salts in cuts of meat is therefore unlikely to create a health hazard and indeed it may provide a benefit. If a dose of 250 gm. of sodium ascorbate is administered and distributed throughout the animal, the concentration of ascorbate in the muscle tissue is of the order of 50 parts per million.

In one series of tests on cattle of average liveweight of 350 kg. each, 500 ml. of 50% w/v solution of sodium ascorbate in saline (i.e. a dose of 250 gm. of sodium ascorbate) was injected into the jugular vein of each test animal. For comparison, 500 ml of a 10% w/v solution of sodium ascorbate in saline (i.e. a dose of 50 gm. of sodium ascorbate) was injected into other animals. The animals were slaughtered under sterile conditions and samples of fillet steak and sirloin steak were obtained from each animal. The fillet muscle (m. psoas) and sirloin muscle (m. gluteus medius) are particularly prone to discolouration as a result of oxidation of oxymyoglobin.

The samples were packaged and compared with control samples from untreated animals. The control samples from animals treated with the 50 g dose all discoloured more rapidly at any given storage temperature than samples from animals treated with the 250 g dose. For example, at 5° C, samples from animals treated with 250 g dose retained their red colour for 6–7 days whereas the other samples were discoloured within 2 days.

I claim:

1. A process for improving the color stability of fresh meat which is to be sold as prepackaged cuts, characterized in that it comprises the steps of injecting into the vascular system of a living animal from which said meat is to be taken a dose of ascorbic acid or a salt thereof in the range of 0.25g. to 1.25g. per kg. liveweight of the animal, holding the animal for a time sufficient to attain distribution of the ascorbic acid or salt thereof through the muscle tissues, and then slaughtering the animal under bacteriologically clean conditions, whereby the the color of the meat remains stable for 6–7 days under refrigerated conditions.

2. A process according to claim 1, characterized in that the holding time is within the range 1 to 60 minutes.

3. A process according to claim 1, characterized in that the ascorbic acid or salt thereof is administered in a parenterally-acceptable diluent.

4. A process according to claim 1, characterized in that the ascorbic acid salt is sodium ascorbate.

5. A process according to claim 4, characterized in that the sodium ascorbate is administered in a saline solution.

6. A process according to claim 1, characterized in that the animal is a bovine animal.

7. A process according to claim 1, characterized in that the meat is beef.

* * * * *